United States Patent [19]

Mizumoto

[11] 4,338,551
[45] Jul. 6, 1982

[54] TWO-PHASE BRUSHLESS MOTOR DRIVING CIRCUIT

[75] Inventor: Kastuji Mizumoto, Tokorozawa, Japan

[73] Assignee: Pioneer Electronic Corporation, Tokyo, Japan

[21] Appl. No.: 215,768

[22] Filed: Dec. 12, 1980

[30] Foreign Application Priority Data

Dec. 15, 1979 [JP] Japan ............................. 54/163182
Dec. 15, 1979 [JP] Japan ............................. 163183

[51] Int. Cl.³ ........................................... H02K 29/02
[52] U.S. Cl. ................................... 318/254; 330/252
[58] Field of Search ............... 318/254, 254 A, 138; 323/315; 330/252-261

[56] References Cited

U.S. PATENT DOCUMENTS 3,812,434  5/1974  Lommers et al. .............. 330/19
4,135,120  1/1979  Hoshimi et al. ................ 318/138
4,216,436  8/1980  Lefferts ........................... 330/260
4,240,040  12/1980  Saari ................................ 330/255

Primary Examiner—J. V. Truhe
Assistant Examiner—Saul M. Bergmann
Attorney, Agent, or Firm—Sughrue, Mion, Zinn, Macpeak & Seas

[57] ABSTRACT

A driving circuit for a two-phase brushless motor which includes a magnetized rotor, first and second magnetically sensitive elements disposed adjacent the rotor, and a pair of driving coils. The magnetically sensitive elements are coupled in series with one another and a bias voltage is applied thereto. First and second differential pairs of transistors receive inputs from the first and second magnetically sensitive elements, respectively, and the first and second differential pairs are coupled in series with one another and a constant current is applied thereto. Current mirror circuits produce currents in proportion to the currents flowing in the first and second differential pairs and output drivers energize the coils of the motor in response to outputs of the current mirror circuits.

6 Claims, 3 Drawing Figures

TWO-PHASE BRUSHLESS MOTOR DRIVING CIRCUIT

BACKGROUND OF THE INVENTION

The present invention relates to brushless motor driving circuits, and more particularly to a driving circuit for a two-phase brushless motor having a pair of exciting coils.

A brushless motor operates in such a manner that a rotational angle position of a magnetized rotor is detected by magnetically sensitive elements, such as Hall elements, disposed adjacent the rotor, and in response to the detected outputs of the magnetically sensitive elements, coils are excited to thereby apply rotational power to the rotor. A two-phase brushless motor has a pair of coils disposed in the rotational direction of the rotor with about 90 degrees displacement from one to the other.

A prior art driving circuit for a two-phase brushless motor will be described with reference to FIG. 1. Transistors $Q_{11}$ and $Q_{12}$ and transistors $Q_{13}$ and $Q_{14}$ are provided in differential pairs. One output terminal of a Hall element H1 is connected to the bases of the transistors $Q_{11}$ and $Q_{13}$ while the other output terminal thereof is connected to the bases of the transistors $Q_{12}$ and $Q_{14}$. A predetermined bias voltage is applied to a bias terminal (not shown) of the Hall element H1. In accordance with the voltage variations between the output terminals of the Hall element H1, the current distribution for the differential pairs is changed. Transistors $Q_{21}$ and $Q_{22}$ and transistors $Q_{23}$ and $Q_{24}$ are further provided in differential pairs. The current distribution for these two differential pairs is also changed in accordance with the voltage variation between the output terminals of a Hall element H2. A current sink for the currents of the respective differential pairs includes transistors $Q_1$ through $Q_4$, which are biased by a predetermined voltage $E_1$, and resistors $R_1$ through $R_4$ connected to the emitters of the transistors $Q_1$ through $Q_4$, respectively. A current supplying source for supplying currents to the respective differential pairs includes a power supply source $+B$ and resistors $R_5$ through $R_8$.

The changes of the current distributions for the respective differential pairs produce corresponding changes in the voltage drops across the resistors $R_5$ through $R_8$. The voltage variations of the resistors $R_5$ through $R_8$ are amplified by operational amplifiers $OP_1$ through $OP_4$, the outputs of the operational amplifiers $OP_1$ and $OP_2$ are applied to the coil $L_1$, and the outputs of the operational amplifiers $OP_3$ and $OP_4$ are applied to the coil $L_2$.

In the circuit of FIG. 1, any variations in the characteristic resistance values of the resistors $R_1$ through $R_4$ cause variations in the amount of current sunk by the transistors $Q_1$ through $Q_4$. This in turn causes fluctuation in the rotational speed of the motor.

SUMMARY OF THE INVENTION

Accordingly, an object of the invention is to provide a driving circuit for a two-phase brushless motor in which the above-mentioned drawbacks accompanying in the prior art circuit are eliminated.

A two-phase brushless motor driving circuit in accordance with the invention includes a first differential transistor pair including a pair of NPN (or PNP) transistors and a second differential pair including a pair of PNP (or NPN) transistors. The first and the second differential pairs are connected in series and are fed current by a single constant current source. Different bias voltages are applied to magnetically sensitive elements disposed adjacent the rotor so that the base potentials of the respective differential pairs are varied depending on the rotational position of the rotor. The changes of the currents flowing in the current paths of the differential pairs are followed by current mirror circuits which accordingly apply currents to the drive coils of the motor.

DESCRIPTION OF THE PREFERRED EMBODIMENTS

Figure 1:
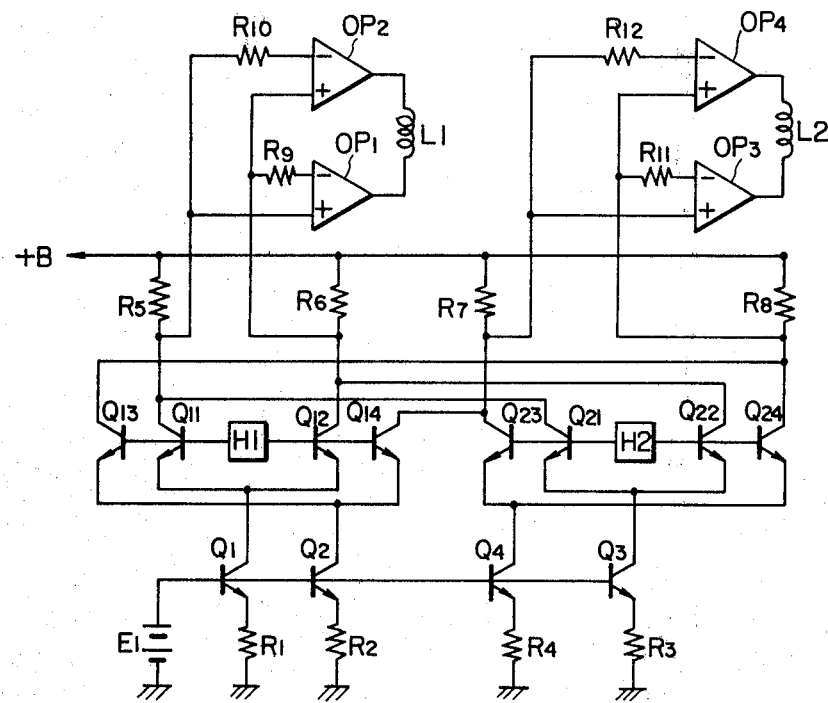
FIG. 1 is a circuit diagram showing a prior art driving circuit for a brushless motor.
Figure 3A:
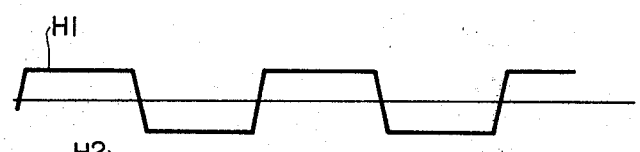
FIGS. 3A through 3D are waveform diagrams for a description of the circuit shown in FIG. 2.
Figure 3B:
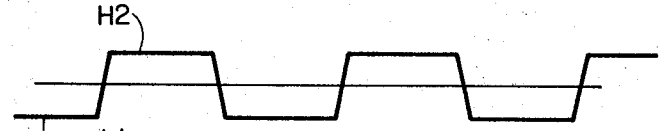
Figure 3C:
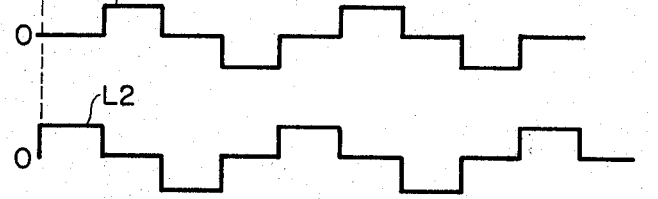
Figure 3D:
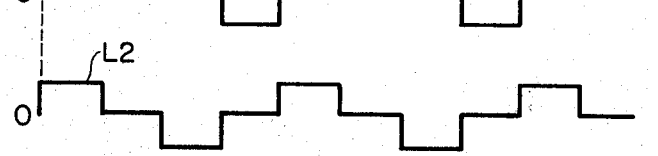
Figure 2:
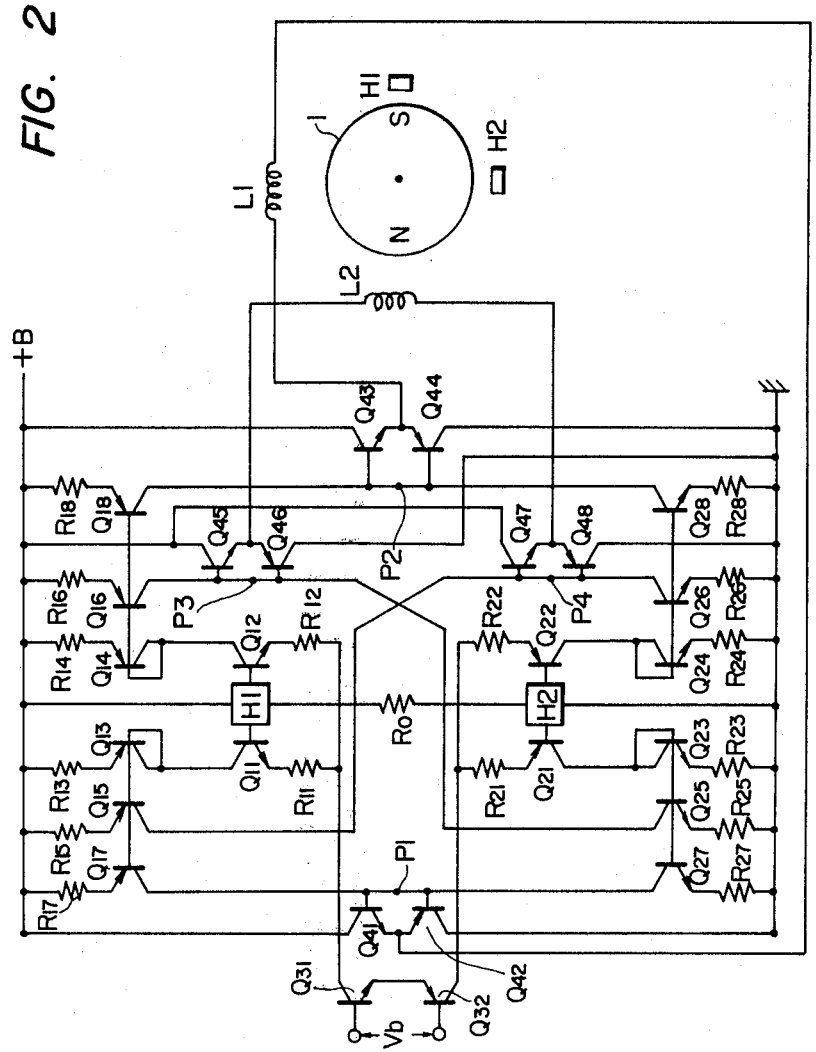
FIG. 2 is a circuit diagram showing a brushless motor driving circuit according to the invention.

A preferred embodiment of the invention will be described with reference to FIGS. 2 and 3. FIG. 2 is a schematic diagram of a two-phase brushless motor and a driving circuit therefor. A rotor 1 of the two-phase brushless motor is magnetized so that appropriate numbers of N-pole and S-pole are arranged alternately along the periphery of the rotor 1. Hall elements H1 and H2 are disposed at stationary positions adjacent the rotor 1 along the rotational direction of the rotor 1 with the magnetic field applied to the Hall elements varying in accordance with the rotation of the rotor 1. Driving coils $L_1$ and $L_2$ are energized by the driving circuit to apply rotational power to the rotor 1. The strength of the rotational power applied thereto depends on the angular position of the rotor 1.

The driving circuit for driving the thus constructed two-phase brushless motor includes first and second transistor differential pairs, and a constant current circuit. The first differential pair includes NPN transistors $Q_{11}$ and $Q_{12}$ and resistors $R_{11}$ and $R_{12}$ respectively connected to the emitters of the transistors $Q_{11}$ and $Q_{12}$ to thereby couple the emitter commonly. The second differential pair includes PNP transistors $Q_{21}$ and $Q_{22}$ and resistors $R_{21}$ and $R_{22}$ respectively connected to the emitters of the transistors $Q_{21}$ and $Q_{22}$. The emitters of the transistors $Q_{21}$ and $Q_{22}$ in the second differential pair are also connected commonly through the resistors $R_{21}$ and $R_{22}$. The constant current circuit includes an NPN transistor $Q_{31}$ and a PNP transistor $Q_{32}$, the emitters of which are commonly connected to each other and the bases of which are biased by a voltage $V_b$ applied between the bases of the transistors $Q_{31}$ and $Q_{32}$. Control terminals of the first and the second differential pairs, which correspond to the bases of the respective transistors included in the first and the second differential pairs, are coupled to the output terminals of the Hall elements H1 and H2. Specifically, the bases of the transistors $Q_{11}$ and $Q_{12}$, which are the control terminals of the first differential pair, are coupled to the output terminals of the Hall element H1 while the bases of the transistors $Q_{21}$ and $Q_{22}$, which are the control terminals of the second differential pair, are coupled to the output terminals of the Hall element H2. Each of the Hall elements H1 and H2 has two bias terminals with first bias terminals of the Hall elements H1 and H2 connected to each other through a resistor $R_0$ and second bias terminals thereof are connected to a power supply source at a voltage $+B$. A resistor $R_{13}$ and a diode-connected transistor $Q_{13}$ are connected in series and are connected between the positive terminal $+B$ of the power supply source and the collector of the transistor $Q_{11}$. Similarly, a series combination of a resistor $R_{14}$ and a diode-connected transistor $Q_{14}$ is connected between the positive terminal thereof and the collector of the transistor $Q_{12}$. A diode-connected transistor $Q_{23}$ and a resistor $R_{23}$ are connected in series and are connected between the collector of the transistors $Q_{21}$ and ground. Similarly, a series combination of a diode-connected transistor $Q_{24}$ and a resistor $R_{24}$ is connected between the collector of the transistor $Q_{22}$ and ground. Current is supplied from the power supply source $+B$ flowing in the current paths of the first and second differential pairs through the series-connected circuits of the resistors and the diode-connected transistor.

The transistor $Q_{13}$ together with transistors $Q_{15}$ and $Q_{17}$ and resistors $R_{15}$ and $R_{17}$ constitutes a first current mirror circuit. The transistor $Q_{14}$ together with transistors $Q_{16}$ and $Q_{18}$ and resistors $R_{16}$ and $R_{18}$ constitutes a second current mirror circuit. The transistor $Q_{23}$ together with transistors $Q_{25}$ and $Q_{27}$ and resistors $R_{25}$ and $R_{27}$ constitutes a third current mirror circuit. The transistor $Q_{24}$ together with transistors $Q_{26}$ and $Q_{28}$ and resistors $R_{26}$ and $R_{28}$ constitutes a fourth current mirror circuit. Each of the current mirror circuits is provided with two output terminals. One output terminal of each of the first and the third current mirror circuits is connected at point $P_1$ while one output terminal of each of the second and the fourth current mirror circuits is connected at point $P_2$. The other output terminal of each of the first and fourth current mirror circuits are connected at point $P_4$ while the other output terminal of each of the second and the third current mirror circuits is connected at point $P_3$. Potential variations at the points $P_1$ through $P_4$ are amplified by first through fourth emitter follower pairs which includes transistors $Q_{41}$ and $Q_{42}$, $Q_{43}$ and $Q_{44}$, $Q_{45}$ and $Q_{46}$, and $Q_{47}$ and $Q_{48}$, respectively. The first and the second emitter follower pairs energize the driving coil $L_1$ and the third and the fourth emitter follower pairs energize the driving coil $L_2$.

In the driving circuit thus constructed, when one of the magnetic poles of the rotor 1 confronts the Hall element H1, a voltage is produced between the output terminals of the Hall element H1. If, for example, the current flowing through the transistor $Q_{12}$ increases while the current flowing through the transistor $Q_{11}$ decreases when the transistor $Q_{21}$ is ON and the transistor $Q_{22}$ is OFF, the potential at point $P_1$ is lowered whereas the potential at point $P_2$ is raised so that current flows from the transistor $Q_{43}$ to the transistor $Q_{42}$. When the opposite magnetic pole confronts the Hall element H1, the current flows in the reverse direction. The same is also true for the Hall element H2, that is, when the magnetic poles of the rotor 1 confront the Hall element H2, exciting current flows in the driving coil $L_2$ in alternating directions as the rotor rotates.

FIGS. 3A through 3D are waveform diagrams showing the output voltage variations of the Hall elements H1 and H2 and the exciting current variations of the currents flowing in the driving coils $L_1$ and $L_2$.

As is apparent from the above description, in accordance with the brushless motor driving circuit of the invention, two differential transistor pairs are coupled in series to which pairs current is supplied from a single constant current source. Accordingly, wow or flutter caused by variations in the power supply voltage are substantially eliminated. Moreover, the current variations in the differential pairs are sensed and amplified by means of current mirror circuits. This makes the dynamic range of the circuit quite wide. Even though the power supply source voltage $+B$ may vary with respect to the voltage $V_b$ supplied to the constant current source, the total magnitude of the current flowing through the differential pairs is maintained unchanged with the invention. Thus, the exciting current to the drive coils is unaffected so that the operation of the motor is stabilized. In addition, by varying the bias voltage $V_b$ applied between the bases of the transistors $Q_{31}$ and $Q_{32}$ of the constant current source, it is possible to control the amount of current supplied to both the first and second differential transistor pairs. Furthermore, by varying the amplitudes of the exciting currents flowing in the driving coils $L_1$ and $L_2$, it is possible to implement rotational speed control of the motor. In this case, the transistors $Q_{31}$ and $Q_{32}$ and the power supply source serve as current supplying means to control the rotational speed of the motor.

What is claimed is:

1. A driving circuit for a two-phase brushless motor including a magnetized rotor, first and second magnetically sensitive elements disposed adjacent the magnetized rotor, and a pair of driving coils provided adjacent the rotor, comprising:
    (a) biasing means for applying a predetermined bias voltage to said first and said second magnetically sensitive elements;
    (b) a first differential pair of transistors coupled to be controlled in response to an output of said first magnetically sensitive element;
    (c) a second differential pair of transistors coupled to be controlled in response to an output of said second magnetically sensitive element, said second differential pair being connected in series with said first differential pair, the polarity of said second differential transistors being opposite to that of said first differential transistors;
    (d) constant current supplying means for supplying constant currents to said first and said second differential pairs;
    (e) current mirror means for supplying currents in proportion to the currents flowing in the first and second differential pairs of the transistors; and
    (f) driving means for energizing said pair of driving coils in response to currents supplied from said current mirror means.

2. The driving circuit as claimed in claim 1 wherein said current mirror means comprises first and second current mirror circuits for supplying currents in proportion to the currents flowing in said first differential pair of the transistors, and third and fourth current mirror circuits for supplying currents in proportion to the currents flowing in said second differential pair of the transistors, and wherein said energizing means supplies currents to said pair of the driving coils in proportion to differences between the currents flowing in said first and said second current mirror circuits and between the current flowing in said third and said fourth current mirror circuits.

3. A driving circuit for a two-phase brushless motor including a magnetized rotor, first and second magnetically sensitive elements disposed adjacent the magnetized rotor, and a pair of driving coils provided adjacent the rotor, comprising:
(a) biasing means for applying a predetermined bias voltage to said first and said second magnetically sensitive elements;
(b) a first differential pair of transistors coupled to be controlled in response to an output of said first magnetically sensitive element;
(c) a second differential pair of transistors coupled to be controlled in response to an output of said second magnetically sensitive element, said second differential pair being connected in series with said first differential pair, the polarity of said second differential transistors being opposite to that of said first differential transistors;
(d) current supplying means for supplying current to said first and said second differential pairs in response to a control signal;
(e) current mirror means for supplying currents in proportion to the currents flowing in the first and second differential pairs of the transistors; and
(f) driving means for energizing said pair of driving coils in response to currents supplied from said current mirror means.

4. The driving circuit as claimed in claim 3 wherein said current supplying means comprises a power supply source for supplying a predetermined voltage between collectors of said first differential circuit and those of said second differential circuit, and a pair of NPN and PNP transistors, emitters of said transistors being connected commonly and collectors thereof being connected to emitters of said first and said second differential pairs, said control signal being applied to bases of said pair of NPN and PNP transistors.

5. A driving circuit for a two-phase brushless motor comprising:
first and second differential transistor pairs coupled in series with one another;
first and second magnetically sensitive elements positioned at predetermined positions adjacent a rotor of a motor to which said circuit is coupled, said first magnetically sensitive element having outputs differentially connected to said first differential pair and said second magnetically sensitive element having outputs differentially connected to said second differential pair, and said first and second magnetically sensitive elements having bias inputs coupled in series with one another; and
means for supplying current to said driving coils in response to currents flowing in said differential pairs.

6. The driving circuit as claimed in claim 5 wherein said current supplying means comprises first through fourth current mirror circuits, said first current mirror circuit having an input coupled to an output circuit of a first transistor of said first differential pair, said second current mirror circuit having an input coupled to an output circuit of a second transistor of said first differential pair, said third current mirror circuit having an input coupled to an output of a first transistor of said second differential pair, and said fourth current mirror circuit having an input coupled to an output circuit of a second transistor of said second differential pair; and first through fourth emitter follower pairs, said first and second emitter follower pairs being coupled to drive a first driving coil and said second and third emitter follower pairs being coupled to drive a second driving coil, the bases of transistors of each pair of said emitter follower pairs being coupled together and the commonly coupled bases of said first emitter follower pair being coupled to a junction point between said first and third current mirror circuits, the commonly connected bases of said second emitter follower pair being coupled to a junction point between said second and fourth current mirror circuits, the commonly connected bases of said third emitter follower pair being coupled to a junction point between said second and third current mirror circuits and the commonly connected bases of said fourth emitter follower pair being coupled to a junction point between said first and fourth current mirror circuits.

* * * * *